US012643817B1

(12) United States Patent
Majewski

(10) Patent No.: US 12,643,817 B1
(45) Date of Patent: Jun. 2, 2026

(54) CEMENTITIOUS SOLIDS WITH DECORATIVE SURFACE PATTERNS AND METHODS OF MAKING THE SAME

(71) Applicant: Emily Majewski, Buffalo, NY (US)

(72) Inventor: Emily Majewski, Buffalo, NY (US)

( * ) Notice: Subject to any disclaimer, the term of this patent is extended or adjusted under 35 U.S.C. 154(b) by 0 days.

(21) Appl. No.: 19/093,918

(22) Filed: Mar. 28, 2025

(51) Int. Cl.
| | |
|---|---|
| *C04B 9/00* | (2006.01) |
| *B28B 5/04* | (2006.01) |
| *C04B 14/02* | (2006.01) |
| *C04B 14/04* | (2006.01) |
| *C04B 16/02* | (2006.01) |
| *C04B 22/00* | (2006.01) |
| *C04B 22/10* | (2006.01) |
| *C04B 28/10* | (2006.01) |
| *C04B 41/53* | (2006.01) |
| *C04B 111/00* | (2006.01) |
| *C04B 111/82* | (2006.01) |

(52) U.S. Cl.
CPC .................. *C04B 9/00* (2013.01); *B28B 5/04* (2013.01); *C04B 14/022* (2013.01); *C04B 14/041* (2013.01); *C04B 16/02* (2013.01); *C04B 22/0013* (2013.01); *C04B 22/106* (2013.01); *C04B 28/105* (2013.01); *C04B 41/5338* (2013.01); *B28B 2005/047* (2013.01); *C04B 2111/00405* (2013.01); *C04B 2111/82* (2013.01)

(58) Field of Classification Search
CPC ....... C04B 9/00; C04B 14/022; C04B 14/041; C04B 16/02; C04B 22/0013; C04B 22/106; C04B 28/105; C04B 41/5338; C04B 2111/00405; C04B 2111/82; C04B 9/02; C04B 9/04; C04B 16/06; C04B 28/10; C04B 41/00; C04B 41/60; C04B 41/70; C04B 41/71; C04B 41/72; C04B 2111/00413; B28B 5/04; B28B 2005/047
See application file for complete search history.

(56) References Cited

U.S. PATENT DOCUMENTS

2010/0263315 A1* 10/2010 Logan ................... E04F 13/147
52/519
2021/0323870 A1* 10/2021 Wu ......................... C04B 14/06
(Continued)

FOREIGN PATENT DOCUMENTS

CN 105503058 A 4/2016
CN 108623248 A 10/2018
(Continued)

OTHER PUBLICATIONS

Mesh Size Comparison Chart 2016 [retrieved from internet on Jul. 23, 2025 from <URL:https://web.archive.org/web/20160123225657/ https://www.valvesonline.com.au/references/mesh-sizing-chart/>] (Year: 2016).*

(Continued)

*Primary Examiner* — Marites A Guino-O Uzzle
(74) *Attorney, Agent, or Firm* — Medler Ferro Woodhouse and Mills PLLC

(57) ABSTRACT

Cementitious wet mixtures and solids such as architectural tiles providing carbon sequestration and being overall carbon negative. The cementitious solids include a binder, a catalyst, and biomass. The biomass has particular particle sizes to enable controlled non-uniform distribution of high and low concentrations of biomass to create particular dual color and/or dual color shade designs.

18 Claims, 4 Drawing Sheets

10 → 12 11

20 → 21 22

(56)   References Cited

U.S. PATENT DOCUMENTS

| | | |
|---|---|---|
| 2022/0106789 A1 | 4/2022 | Kuse et al. |
| 2022/0298073 A1 | 9/2022 | Pecha et al. |

FOREIGN PATENT DOCUMENTS

| | | | | |
|---|---|---|---|---|
| CN | 109250976 A | 1/2019 | | |
| CN | 114538850 A | 5/2022 | | |
| CN | 114804734 A | 7/2022 | | |
| DE | 102021001327 A1 | 9/2022 | | |
| WO | 2019/086780 A1 | 5/2019 | | |
| WO | 2024/033294 A1 | 2/2024 | | |
| WO | 2024/076666 A1 | 4/2024 | | |
| WO | 2024/083983 A1 | 4/2024 | | |
| WO | WO-2024084245 A1 * | 4/2024 | ............ | C04B 20/04 |
| WO | 2024/110296 A1 | 5/2024 | | |

OTHER PUBLICATIONS

Zhou et al. Review of the research progress of magnesium oxysulfate cement and its recent application in green manufacturing, Journal of Cleaner Production, v490, 2025, pp. 144751. DOI: 10.1016/j.jclepro.2025.144751. (Year: 2025).*

JP Group MagMatrix Brand, MagMatrix New Sulfate Magnesium Oxide Board for Interior Uses. 2024 [retrieved from internet on Jul. 24, 2025 from <https://www.magmatrixboards.com/post/magmatrix-new-sulfate-magnesium-oxide-board-for-interior-uses>]. (Year: 2024).*

* cited by examiner

CEMENTITIOUS SOLIDS WITH DECORATIVE SURFACE PATTERNS AND METHODS OF MAKING THE SAME

TECHNICAL FIELD

The present disclosure relates to cementitious compositions and solids and building materials, such as wall and ceiling tiles, made from those compositions. The cementitious compositions are carbon negative by incorporating substantially higher amounts of carbon in the form of pyrolyzed or non-pyrolyzed cellulose. The cementitious solids can be formed from the cementitious compositions to have decorative surface patterns created from incorporating the pyrolyzed or non-pyrolyzed cellulose in particle sizes that result in dual colors or dual shades. The cementitious compositions are carbon negative by incorporating substantially higher amounts of carbon than known cementitious compositions.

BACKGROUND

Conventional building materials release greenhouse gases during one or more of: the manufacturing process, during transportation, during customer use and end of life. The manufacture of most products involves the generation of greenhouse gas emissions by using raw materials which have been mined or manufactured using fossil fuels and/or by transporting the product and/or reagents. To transition the industry to a net neutral position or to reduce the carbon footprint of the construction sector, it is desired to utilize building materials that remove carbon dioxide from the atmosphere and offer lower embodied carbon.

One strategy to increase the carbon incorporated into building material is to incorporate biochar in cement. However, typical cement, such as Portland Cement, including biochar have two major drawbacks. First, ordinary Portland Cement is notoriously unecological and therefore the eco-improvements offered by the inclusion of carbon are largely negated by the carbon impacts of this mineral binder. For example, Portland cement clinker is made by heating, in a cement kiln, a mixture of raw materials to a calcining temperature of about 600° C. (1,112° F.) and then a fusion temperature, which is about 1,450° C. (2,640° F.). Second, the percentage of carbon able to be incorporated into ordinary cement has to date been very limited, typically ranging from the lower end of 1% to rare instances of 20-30%. Accordingly, there is a need for improved cementitious compositions that are more ecological and can incorporate larger percentages of carbon in building materials.

In addition to the cementitious materials themselves, decorative tiles used as wall or ceiling tiles, especially designs involving more than one color, typically include surface designs that involve paint or other coating products. Surface coatings typically add to manufacturing expense as well as added greenhouse gas emission generation.

Currently, most consumers cannot determine when a "greener" product is being used. For example, a "green" version of drywall looks similar to a normal version of drywall. Similarly, a "low carbon" version of concrete looks like regular concrete. This indistinguishability prevents consumers and specifiers from communicating their greener choices without signage. Other than choosing wood finishes, there are not many building products that visually and distinctively communicate the qualities of being natural, healthy and carbon storing.

SUMMARY

The inventor discovered cementitious binder material that is less hostile to carbon incorporation and that requires lower temperatures in formation and overall improvement in carbon impact compared to existing cementitious compositions used in building materials. In particular, certain cementitious binder material enables substantially higher concentrations of carbon-based, carbon-rich material, such as cellulose material, to be incorporated in cementitious solids. The cellulose material can be pyrolyzed in the form of biochar or non-pyrolyzed cellulose.

Additionally, the inventor discovered that by manipulating the particle size of the cellulose material, a dual color and/or dual shade aesthetic can be created without the addition of surface coatings. These dual color and/or dual shade aesthetics can be arranged to provide different designs. By using the cellulose material itself as a way of creating the dual color and/or dual shade, the stored carbon becomes visible and aesthetic and becomes a way for properties and designers to communicate their "greener" choices to occupants and investors without sacrificing the beauty expected of finishes.

In one aspect, disclosed is a cementitious solid including a binder including magnesium, a catalyst including a metal salt or ammonium salt, and biomass. In another aspect, disclosed is a wet mixture including a binder including magnesium, a catalyst including a metal salt or ammonium salt, biomass, and water.

The inventor also discovered that specially aggregated and sized constituents in a cementitious slurry can result in cementitious solids having dual color and/or dual color shade surface designs without surface coatings. In particular, Applicant discovered that particular mesh sizes or particle sizes of biomass in the cementitious slurry can be used to create dual color and/or dual shade surface designs.

In one aspect, the cementitious solids include a binder, a catalyst(s), optional fillers and pigments, and biomass particles. The biomass particles have a particle size not less than 50 mesh and not greater than 25 mesh. In some embodiments, the particle size of the biomass particles is not less than 48, 45, 42, or 40 mesh and not greater than 27, 30, 32, or 35 mesh. Herein, "binder" refers to a substance that holds or draws other materials of the cementitious solid together to form a cohesive whole. In particular embodiments, the binder includes magnesium. Herein, "catalyst" refers to a substance that assists in allowing the cementitious solid to cure with large quantities of biomass and biochar. In particular embodiments, the catalyst includes metal salt or ammonium salt. Herein, "biomass" refers to any renewable organic material that comes from plants or animals. In particular embodiments, the biomass includes cellulosic material. The biomass incorporated into the cementitious composition or solid can be pyrolyzed or non-pyrolyzed. Pyrolyzed biomass includes "biochar," which refers to any carbon-rich material made by subjecting biomass to pyrolysis. Herein, "mesh" refers to a measurement of particle size, in which the number represents the number of holes per inch of a sieve or screen for which particles can pass through such that the larger the mesh size the smaller the particle size.

In another aspect, the cementitious solid includes a binder, a catalyst, and biomass particles, wherein at least 90% of the biomass particles in the cementitious solid have a particle size not less than 250 microns and not greater than 750 microns. In some embodiments, at least 90% of the biomass particles in the cementitious solid have a particle size not less than 260, 280, 300, 330, 350, 370, or 400 microns and not greater than 740, 720, 700, 680, 650, 630, 600, or 580 microns. In other embodiments, at least 95% of the biomass particles in the cementitious solid have a particle size not less than 250, 260, 280, 300, 330, 350, 370, or 400 microns and not greater than 750, 740, 720, 700, 680, 650, 630, 600, or 580 microns.

In yet another aspect, the cementitious solid includes a binder, a catalyst, and biomass particles, wherein the biomass particles are non-uniformly distributed within the cementitious solid in at least two zones. A first zone has a higher concentration of biomass particles than a second zone such that the first zone has a different color and/or darker color shade than the second zone.

In some embodiments, the color shade difference ($\Delta L^*$) between the first zone and the second zone is at least 10 on L* axis of CIELAB color space. In other embodiments, the color shade difference is at least 20, 30, 40, 50, 60, 70, or 80. Herein, "CIELAB color space" refers to a color space defined by the International Commission on Illumination (abbreviated CIE) in 1976, which expresses color as three values: L* for perceptual lightness and a* and b* for the four unique colors of human vision: red, green, blue, and yellow. Herein, "L* axis" has the meaning provided in CIELAB color space, which is the axis on which lightness of the color is represented with values between 0 for black to 100 for white.

In some embodiments, the color difference ($\Delta a^*$ or $\Delta b^*$) between the first zone and the second zone is at least 3 on a* axis, b* axis, or a combination of the two axes ($\Delta E^*$) on CIELAB color space. In other embodiments, the color difference is at least 5, 10, 20, 30, 40, 50, 60, 70, or 80. Herein, "a* axis" has the meaning provided in CIELAB color space, which is the axis to the green-red opponent colors, with negative values toward green and positive values toward red, and with values from −150 to 150. Herein, "b* axis" has the meaning provided in CIELAB color space, which is the axis to the blue-yellow opponent colors, with negative values toward blue and positive values toward yellow, and with values from −150 to 150. Herein, "$\Delta E^*$" has the meaning provided in CIELAB color space, which is a Euclidean measure of color difference. An example of a formula to calculate $\Delta E^*$ is $\Delta E_{ab}^* = \sqrt{(L_2^* - L_1^*)^2 + (a_2^* - a_1^*)^2 + (b_2^* - b_1^*)^2}$. In the above equation, 2.3 is typically the just noticeable difference for visual inspection.

In some embodiments, a major surface of the cementitious solid includes a raised portion extending away from the major surface, wherein the first zone is located in the raised portion. Herein, "a major surface" means a surface of the cementitious solid which has one of the largest or the largest surface area of the surfaces of the cementitious solid. In other embodiments, the major surface includes a plurality of raised portions extending away from the major surface, wherein each of the raised portions includes substantially the same concentrations of biomass particles and thereby substantially the same color shade. The plurality of raised portions can be arranged on the major surface to form a design.

In yet another aspect, a mixture for use with water to form a slurry includes a binder, a catalyst, and biomass particles having a particle size not less than 50 mesh and not greater than 25 mesh. In some embodiments, the particle size of the biomass particles is not less than 48, 45, 42, or 40 mesh and not greater than 27, 30, 32, or 35 mesh.

In yet another aspect, a mixture for use with water to form a slurry includes a binder, a catalyst, and biomass particles, wherein at least 90% of the biochar particles in the cementitious solid have a particle size not less than 250 microns and not greater than 750 microns. In some embodiments, at least 90% of the biomass particles in the mixture have a particle size not less than 260, 280, 300, 330, 350, 370, or 400 microns and not greater than 740, 720, 700, 680, 650, 630, 600, or 580 microns. In other embodiments, at least 95% of the biomass particles in the mixture have a particle size from 250, 260, 280, 300, 330, 350, 370, or 400 microns and not greater than 750, 740, 720, 700, 680, 650, 630, 600, or 580 microns.

In yet another aspect, a method for forming a cementitious solid is provided. The method includes obtaining biomass particles having a particle size not less than 50 mesh and not greater than 25 mesh; forming a slurry comprising a binder, a catalyst, the biomass particles, and water; casting or pressing the slurry into a mold or a form liner; vibrating the slurry within the mold or the form liner to allow mineral particles, such as the binder, catalyst, and certain fillers, activators, or pigments, to sink to a bottom of the mold or the form liner; curing the slurry to form a cementitious solid; and once cured, either:

polishing a major surface of the cementitious solid to
      remove from the raised portions of the major surface
      the top layer having a higher concentration of the
      mineral particles so as to reveal differently colored or
      shaded content inside the raised portions having a
      higher concentration of biomass particles compared to
      the non-raised portions of the major surface, or
   routering a major surface of the cementitious solid to
      remove portions of the major surface to form depres-
      sions or non-raised portions in the major surface,
      wherein the non-removed, raised portions have a higher
      concentration of the mineral particles so as to reveal
      differently colored or shaded content inside the non-
      raised portions having a higher concentration of bio-
      mass particles compared to the raised portions of the
      major surface. In some embodiments, the particle size
      of the biomass particles is not less than 48, 45, 42, or
      40 mesh and not greater than 27, 30, 32, or 35 mesh.

In yet another aspect, another method for forming a cementitious solid is provided. The method includes obtaining biomass particles, wherein at least 90% of the biomass particles in the cementitious solid have a particle size not less than 250 microns and not greater than 750 microns; forming a slurry comprising a binder, a catalyst, the biomass particles, and water; casting or pressing the slurry into a mold or a form liner; vibrating the slurry within the mold or the form liner to allow mineral particles, such as the binder, catalyst, and certain fillers, activators, or pigments, to sink to a bottom of the mold or the form liner; curing the slurry to form a cementitious solid; and once cured, either:

polishing a major surface of the cementitious solid to
      remove from the raised portions of the major surface
      the top layer having a higher concentration of the
      mineral particles so as to reveal differently colored or
      shaded content inside the raised portions having a
      higher concentration of biomass particles compared to
      the non-raised portions of the major surface, or
   routering a major surface of the cementitious solid to
      remove portions of the major surface to form depres-
      sions or non-raised portions in the major surface,
      wherein the non-removed, raised portions have a higher
      concentration of the mineral particles so as to reveal
      differently colored or shaded content inside the non-raised portions having a higher concentration of biomass particles compared to the raised portions of the major surface.

In some embodiments, at least 90% of the biomass particles in the slurry have a particle size not less than 260, 280, 300, 330, 350, 370, or 400 microns and not greater than 740, 720, 700, 680, 650, 630, 600, or 580 microns. In other embodiments, at least 95% of the biomass particles in the slurry have a particle size not less than 250, 260, 280, 300, 330, 350, 370, or 400 microns and not greater than 750, 740, 720, 700, 680, 650, 630, 600, or 580 microns.

In yet another aspect, another method for forming a cementitious solid is provided. The method includes obtaining biomass particles; forming a slurry comprising a binder, a catalyst, the biomass particles, and water; casting or pressing the slurry into a mold or a form liner, wherein the mold or the form liner includes a portion of a major surface of the mold or the form liner that is raised with respect to another portion of the major surface; vibrating the slurry within the mold or the form liner to allow mineral particles to accumulate in a larger concentration adjacent the major surface of the mold or the form liner; curing the slurry to form a cementitious solid; and once cured, polishing or routering a major surface of the cementitious solid to reveal an interior zone of the major surface of the cementitious solid having a different color and/or darker color shade than a second zone of the major surface of the cementitious solid. In some embodiments, the color shade difference ($\Delta L^*$) between the first zone and the second zone is at least 10 on $L^*$ axis of CIELAB color space. In other embodiments, the color shade difference is at least 20, 30, 40, 50, 60, 70, or 80. In some embodiments, the color difference ($\Delta a^*$ or $\Delta b^*$) between the first zone and the second zone is at least 3 on $a^*$ axis, $b^*$ axis, or a combination of the three axes ($\Delta E^*$) on CIELAB color space. In other embodiments, the color difference is at least 5, 10, 20, 30, 40, 50, 60, 70, or 80. In other embodiments, the major surface includes a plurality of raised portions extending away from the major surface. After polishing the mineral-rich exterior surface off the raised portions or routering the mineral-rich exterior surface to form non-raised portions, the interior biomass-rich zone revealed on those polished raised portions or routered non-raised portions substantially contrast with the continuous mineral-rich exterior zone surface remaining on the non-raised portions or raised portions, respectively, of the major surface. This contrast results in a dual color and/or dual shade design. The plurality of raised portions can be arranged on the major surface to form a design.

In some embodiments of any of the above aspects, the binder includes magnesium. In other embodiments of any of the above aspects, the binder includes magnesium oxide, magnesium hydroxide, magnesium oxychloride cement, magnesium oxysulfate cement, magnesium carbonate cement, or magnesium phosphate cement. In particular embodiments, the binder includes magnesium oxide, magnesium oxysulfate cement, or magnesium carbonate cement. In yet more particular embodiments, the binder includes magnesium oxide or magnesium carbonate cement.

In embodiments in combination with any of the above aspects or embodiments, the catalyst includes a metal salt or ammonium salt. In particular embodiments, the catalyst comprises an alkali metal salt. In particular embodiments, the catalyst comprises at least one of alkali metal carbonate, alkali metal bicarbonate, or alkali metal borate. In more particular embodiments, the catalyst comprises at least one of sodium carbonate, sodium bicarbonate, or sodium tetraborate. In more particular embodiments, the catalyst is a combination of metal carbonate and metal borates. In yet more particular embodiments, the catalyst is a combination of sodium bicarbonate and sodium tetraborate.

In embodiments in combination with any of the above aspects or embodiments, biomass can include pyrolyzed carbon sources such as biochar or non-pyrolyzed carbon sources such as cellulose fibers, straw, hemp, rice hulls, coconut coir, corn cobs, nut husks and shells, wood mulch, and/or bark mulch. In certain embodiments, the biomass includes biochar, husks, shells, hemp, straw, cellulose fibers, and/or wood mulch. In more certain embodiments, the biomass includes biochar, nut husks and shells, and/or hemp. In certain embodiments, the nut husks and shells are from walnuts.

In embodiments in combination with any of the above aspects or embodiments, the cementitious solid, mixture, or slurry in the method further comprises activators. In particular embodiments, the activators include metal silicate. In more particular embodiments, the metal silicate is an alkaline earth metal silicate or boron group metal silicate. In yet more particular embodiments, the metal silicate is aluminum silicate or calcium silicate. The metal silicate can act as an activator for the cementitious mixture or solid.

In embodiments in combination with any of the above aspects or embodiments, the cementitious solid, mixture, or slurry in the method further comprises inert fillers and/or pigments. In certain embodiments, the inert fillers include, for example, diatomaceous earth, clays, talc. In certain embodiments, the pigments include, for example, iron oxides.

In embodiments in combination with any of the above aspects or embodiments, composition of the cementitious solid, mixture, or slurry in the method comprises 40 wt % to 75 wt % binder, 20 wt % to 57 wt % biomass, and 3 wt % to 10 wt % catalyst based on the total weight percentage of the binder, the catalyst, and the biomass. In other embodiments in combination with any of the above aspects or embodiments, composition of the cementitious solid, mixture or slurry in the method comprises 30 wt % to 60 wt % binder, 5 wt % to 15 wt % non-pyrolyzed biomass, and 3 wt % to 7 wt % catalyst, and 30 wt % to 60 wt % biochar based on the total weight percentage of the binder, the catalyst, the non-pyrolyzed biomass, and the biochar.

The mixture after adding water to form a slurry according to any of the embodiments disclosed above can be used to form any shaped object through a mold based process or 3D-printing. The mixture or cementitious solid has particular use in construction as a building material, including for example, tiles, panels, and blocks. Specific examples of such building material includes tiles or exterior cladding. Tiles include, for example, floor tiles, wall tiles, or drop ceiling tiles.

Figure 1A:
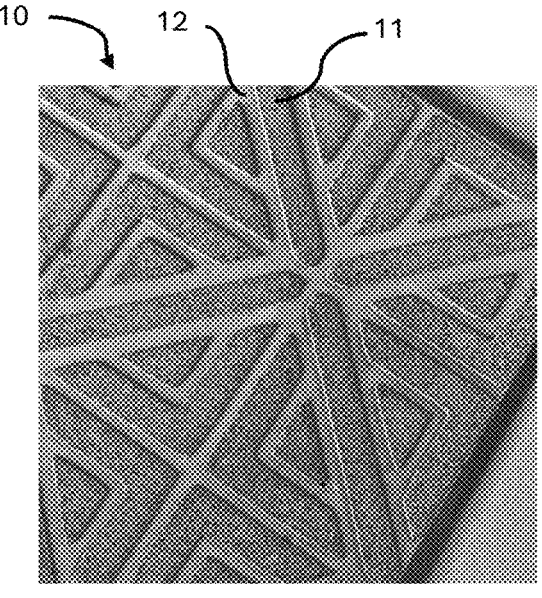
FIGS. 1A-1G show examples of cementitious solids according to different embodiments of the invention.
Figure 1B:
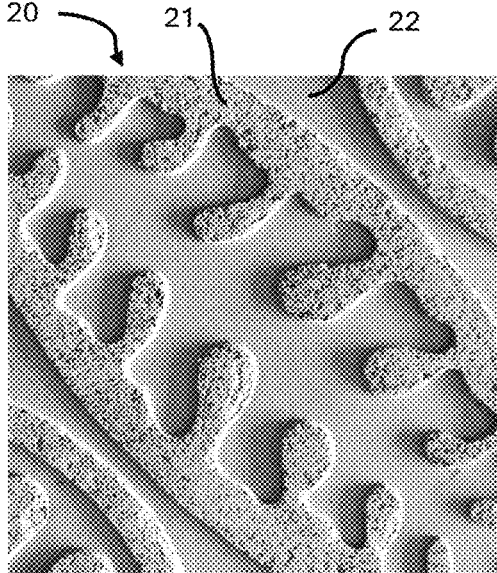
Figure 1C:
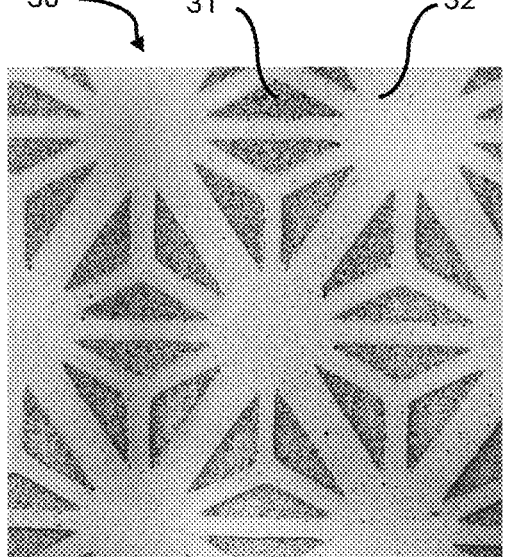

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure.

DETAILED DESCRIPTION OF PARTICULAR EMBODIMENTS

Before describing several exemplary embodiments, it is to be understood that the invention is not limited to the details of construction or process steps set forth in the following description. The invention is capable of other embodiments and of being practiced or being carried out in various ways.

Reference throughout this specification to "one embodiment," "certain embodiments," "one or more embodiments" or "an embodiment" means that a particular feature, structure, material, or characteristic described in connection with the embodiment is included in at least one embodiment. Thus, the appearances of the phrases such as "in one or more embodiments," "in certain embodiments," "in one embodiment" or "in an embodiment" in various places throughout this specification are not necessarily referring to the same embodiment. Furthermore, the particular features, structures, materials, or characteristics may be combined in any suitable manner in one or more embodiments.

Although reference herein is to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

Reference throughout this specification to "a" or "an" represents one or more and is not limited to singular form, unless explicitly stated.

Disclosed is a composition for forming cementitious solids, a cementitious solid formed from the composition, and building materials, such as tiles, formed from said composition. The disclosed composition incorporates substantially more carbon than traditional cementitious compositions and/or cementitious solids. In addition, the disclosed composition requires less energy to form the cementitious solid than traditional cementitious compositions. This combination of incorporation of higher carbon contents and the lower energy requirements in formation enable carbon negative building materials.

Further, the compositions, cementitious solids, and building materials incorporate biomass particles having particular particle sizes to create cementitious solids and building materials having different zones of biomass concentrations such that decorative designs are formed. In particular, the black color of biochar creates shades or darkens cementitious solids as the concentration of biochar increases. Similarly, having different zones of concentrations of other biomass can create different color zones. For example, the dark brown color of walnut husks and shells create a brown color compared to cream or white color for zones having lower concentration of walnut husk and shells. Accordingly, by non-uniformly distributing biomass particles within the cementitious solid, the cementitious solid can be formed with different colors and/or shades in predetermined zones on the surface of the cementitious solid.

The inventor discovered that incorporating different particle sizes of biomass provides different levels of control with regard to biomass particle distribution within cementitious solids. For example, where the particle sizes are too small, the biomass distributes homogeneously throughout the cementitious solid resulting in a single color throughout and lacking distinct color or shade zones. In the other extreme, where the particle and aggregate sizes are too large, the coarse biobased-aggregates generate a terrazzo look very distinct from the aesthetic outcome of embodiments of the present invention.

Figure 3A:
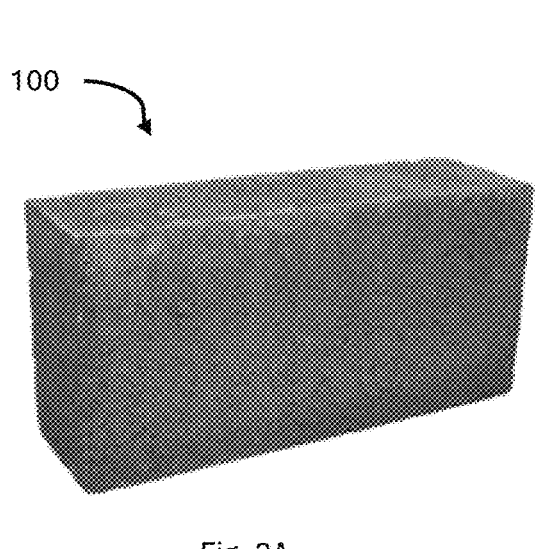
FIGS. 3A-D show examples of cementitious solids incorporating biochar particles with different particle sizes.
Figure 3B:
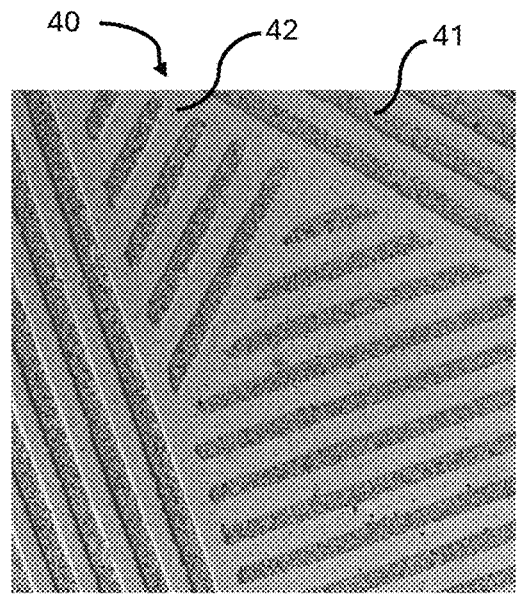
Figure 3C:
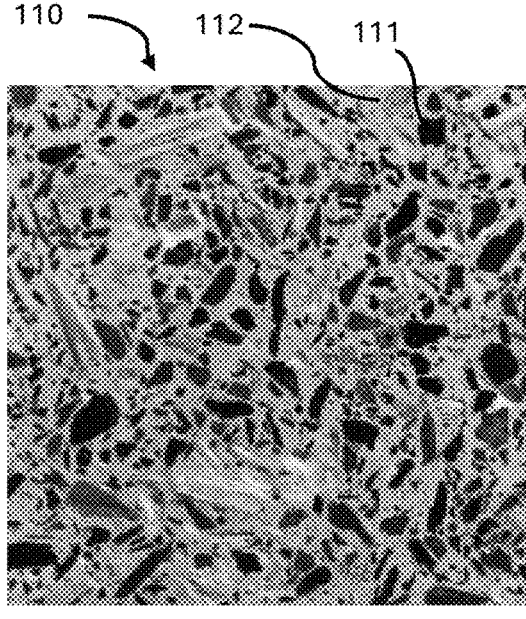
Figure 3D:
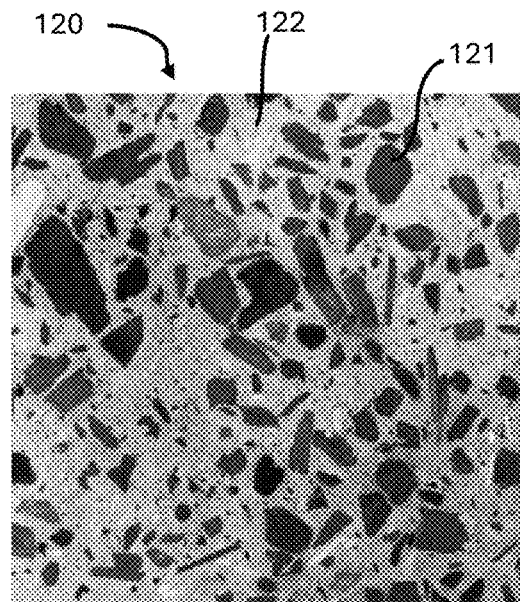

FIG. 3A is an example of a cementitious solid incorporating biochar with small particle size or powder material. FIG. 3D is an example of a cementitious solid incorporating biochar with large particle size or chip material. FIG. 3C is an example of a cementitious solid incorporating biochar with particle size less than those in the example in FIG. 3D and greater than those in the example in FIG. 3A. Although the darker, high concentration of biochar zones in FIG. 3C are more evenly distributed than in FIG. 3D, the distribution of higher and lower concentration zones are still randomly distributed across the surface. FIG. 3B is an example of a cementitious solid incorporating biochar particles having a particle size greater than those in the example in FIG. 3A but smaller than those in the embodiment in FIG. 3C. The particle size used in the embodiment in FIG. 3B resulted in higher and lower concentration zones that are controllably distributed such that clean lines between zones and particular design patterns can be formed. Similar results occur with other types of biomass particles when the same particle sizes are utilized, except rather than changing shades of a single color a second color is created.

According to an aspect, the disclosed cementitious composition includes a binder, biomass, and a catalyst. The biomass incorporated into the cementitious composition has a particle size large enough to separate into different zones of concentration when molded into a cementitious solid. In certain embodiments, the particle size of the biomass is not less than 50 mesh or not less than 300 microns. Smaller particle sizes are typically not large enough to separate into different zones of concentrations and cementitious solids formed with biomass having a particle size not less than 50 mesh or not less than 300 microns are typically a homogenous color, such as charcoal gray color if the biomass is biochar. The cementitious solid 100 in FIG. 3A is an example of a cementitious solid including a particle size less than 50 mesh or less than 300 microns. In contrast, cementitious solid 110 in FIG. 3C and cementitious solid 120 in FIG. 3D are examples of a cementitious solid including a particle size greater than 50 mesh and greater than 300 microns. As can be seen in FIG. 3C, which incorporated biochar having a particle size greater than 25 mesh or greater than 700 microns and less than 3 mm, a first zone 111 has a black color from a high concentration of biochar and a second zone 112 has a light gray color from a low concentration of biochar. Similarly, as can be seen in FIG. 3D, which incorporated biochar chips having a particle size greater than 3 mm mesh size and as large as 1 inch mesh size, a first zone 121 has a black color from a high concentration of biochar and a second zone 122 has a light gray color from a low concentration of biochar. It is noted that high concentration of biochar in second zone 122 in FIG. 3D has larger surface area than similar high concentration of biochar zones, such as zone 112 in FIG. 3C. Similar results occur with other types of biomass particles when the same particle sizes are utilized, except rather than changing shades of a single color a second color is created.

Figure 1D:
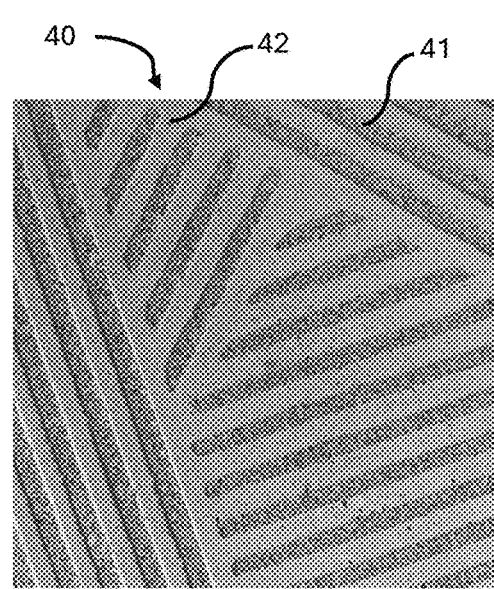

According to another aspect, the disclosed cementitious composition includes a binder, biomass, and a catalyst. The biomass incorporated into the cementitious composition has a particle size large enough to separate into different zones of concentration, but small enough such that the distribution of higher and lower concentrations of biochar can be controlled when molded into a cementitious solid. Larger particle sizes typically result in a different aesthetic effect, similar to traditional terrazzo, and does not allow for fine, detailed patterns through color or shade contrast. For example, biochar particles having a particle size greater than 25 mesh or greater than 700 microns typically result in different zones of concentrations similar to those in FIGS. 3C and 3D discussed above. In contrast, cementitious solid 40 in FIGS. 3B and 1D is an example of a cementitious solid including a particle size greater than 50 mesh and greater than 300 microns, but less than 25 mesh and less than 700 microns. As can be seen in FIGS. 3B and 1D, which incorporated biochar having a particle size less than 25 mesh or less than 700 microns and greater than 50 mesh or greater than 300 microns, a first zone 41 has a dark gray color from a high concentration of biochar and a second zone 42 has a light gray color from a low concentration of biochar. In addition, the high concentration of biochar zones having the dark gray color are distributed in controlled shapes according to a predetermined pattern across the surface of cementitious solid 40. Similar results occur with other types of biomass particles when the same particle sizes are utilized, except rather than changing shades of a single color a second color is created.

Figure 1E:
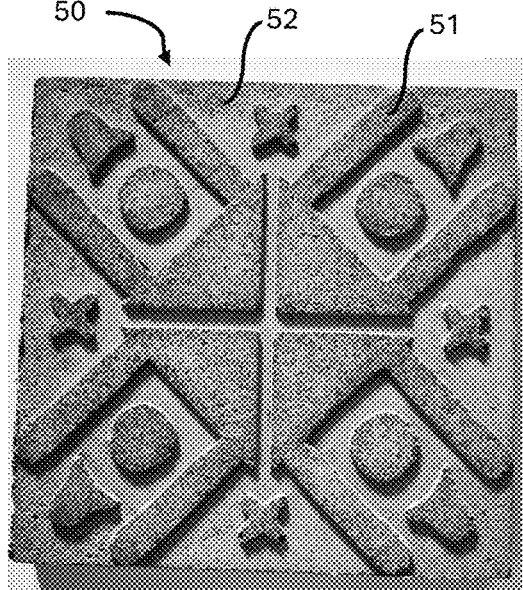
Figure 1F:
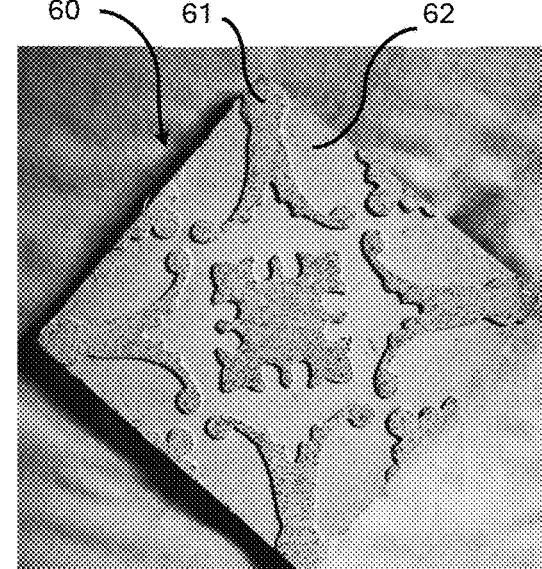

Additional materials, such as pigments, can be added to the mixture forming the cementitious solids to add specific colors. Where the base color is other than white or cream, then the higher and lower concentrations zones of biochar create different color shades of the base color. For example, in the embodiments illustrated in FIGS. 1A-1D and 1G, the cementitious solids 10, 20, 30, 40 include a first zone 11, 21, 31, 41, 67 having a higher concentration of biochar that has a darker gray color than a second zone 12, 22, 32, 42, 66 having a lower concentration of biochar. In the embodiment illustrated in FIG. 1E, the mixture forming the cementitious solid 50 has a brownish color. Accordingly, a first zone 51 having a higher concentration of biochar has a darker brown color than a second zone 52 having a lower concentration of biochar. Similarly, as illustrated in FIG. 1F, the mixture forming the cementitious solid 60 has a bluish color. Accordingly, a first zone 61 having a higher concentration of biochar has a darker blue color than a second zone 62 having a lower concentration of biochar. Similar results occur with other types of biomass particles when the same particle sizes are utilized, except rather than changing shades of a single color a second color is created.

Figure 1G:
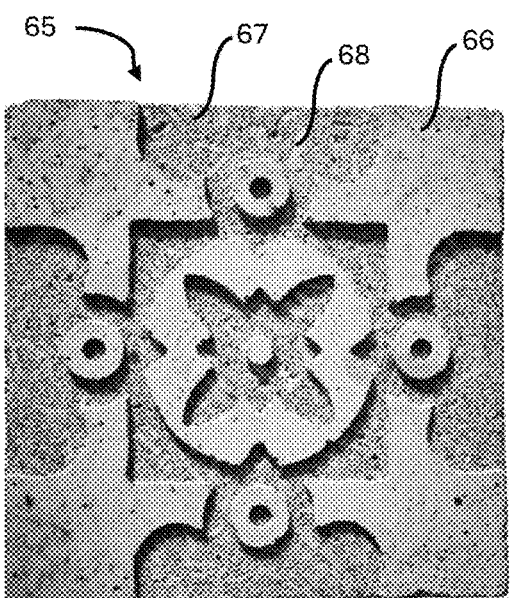
Figure 2A:
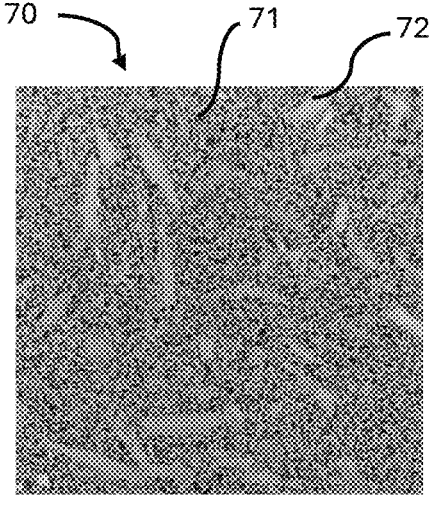
FIGS. 2A-2C show examples of cementitious solids according to different embodiments of the invention.
Figure 2B:
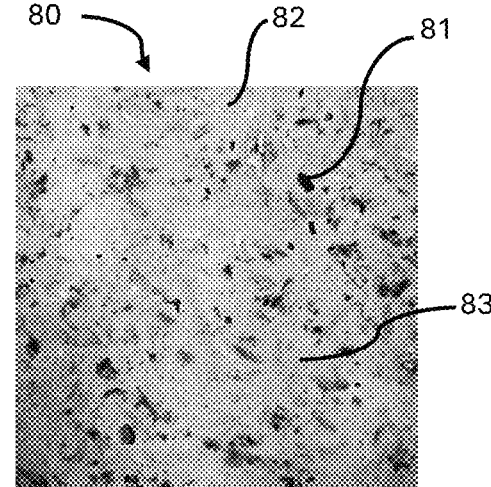
Figure 2C:
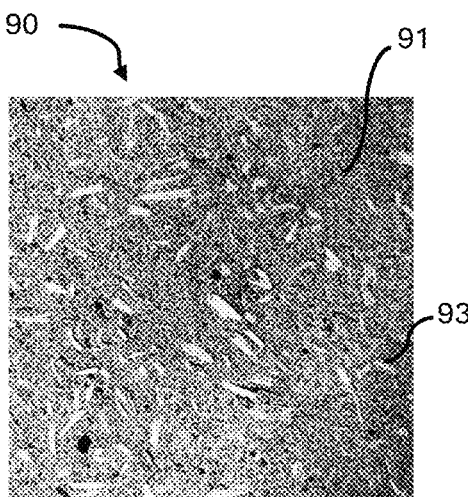

Also, additional color can be added to the cementitious solids incorporating biochar by the addition of biomass having different natural colors. For example, different amounts and particle sizes of cellulose fibers, stray hemp, rice hulls, coconut coir, corn cobs, nut husks and shells, wood mulch, or bark mulch can be added to the mixture forming the cementitious solids. For example, in the embodiments illustrated in FIGS. 2A-2C and 1G, the cementitious solids 65, 70, 80, 90 include additional biomass zones 68, 73, 83, 93. These additional biomass zones 68, 73, 83, 93 include different amounts and particles sizes of the biomass listed above and their natural colors provide brown/gold colored zones. Depending on the particle sizes of the biochar in the cementitious solids 65, 70, 80, 90, there is a continuous gray color zone 67, 71, 91 in which the additional biomass zones 68, 73, 93 form islands, as shown in the embodiments of FIGS. 2A, 2C, and 1G, or randomly distributed first zones of high concentrations of biochar 81, second zones of low concentrations of biochar 82, and additional biomass zones 83, as shown in the embodiment of FIG. 2B. Although not clearly shown in the figures, additional biomass could be present in the embodiments shown in FIGS. 1A-1E in amounts and particle sizes that are not visible on the surface of the cementitious solids. Further, although embodiments are not illustrated having both clearly visible additional biomass zones and controlled first and second zones of higher and lower concentrations of biochar, such embodiments are contemplated by the inventor and flow naturally from the teachings herein.

In addition to affecting base color or different color zones within the cementitious solids, the additional biomass affects physical properties of the cementitious solids. Specifically, different types and amounts of the additional biomass effects weight, cost, strength, insulative, and acoustic properties of the cementitious solid.

The cementitious solids discussed above can be made by different methods. In an aspect, a method to form a cementitious solid includes obtaining biomass particles; forming a slurry comprising a binder, a catalyst, the biomass particles, and water; casting or pressing the slurry into a mold or a form liner; vibrating the slurry within the mold or the form liner to allow mineral particles, such as the binder, catalyst, and certain fillers, activators, or pigments, to sink to a bottom of the mold or the form liner; curing the slurry to form a cementitious solid; and once cured, either:

polishing a major surface of the cementitious solid to remove from the raised "embossed" portions of the major surface the top layer having a higher concentration of the mineral particles so as to reveal the interior, biomass-rich content of a layer on the raised portions having a higher concentration of biomass particles compared to the non-raised portions of the major surface where the previously continuous mineral layer is undisturbed, or routering a major surface of the cementitious solid to remove portions of the major surface to form depressions or non-raised portions in the major surface, wherein the non-removed, raised portions where the continuous mineral layer is undisturbed has a higher concentration of the mineral particles compared to the revealed interior, biomass-rich content in the depressions or non-raised portions in the major surface.

All the same considerations and inventive concepts discussed above related to the cementitious solids pertain equally to the method of making, especially the particle size of the biomass particles.

With regard to the mold or form liner used in the method of making cementitious solids according to embodiments herein, providing raised portions in different shapes and sizes create both raised or relief designs in the cementitious solids. Biomass particles having particular particle sizes are able to allow mineral particles to sink or move towards the surface of the mold or form liner based on gravity such that higher concentrations of mineral particles accumulate near one surface than the opposing surface of the cementitious solid. When the surface having the higher concentration of mineral particles is polished, the raised portions are exposed to the polishing and the higher concentration of mineral particles is removed from the surface of the raised portions. Thus, the raised portions become first zones revealing the higher internal concentrations of biomass compared to the non-raised, non-polished portions forming second visually contrasting zones within a major surface of the cementitious solid. Examples of embodiments made according to this method are shown in FIGS. 1A-F.

The depth of the raised portions compared to the non-raised portions of the mold or form liner is another factor that can be manipulated to make smaller or larger color shade differences between zones of a major surface of the cementitious solid. The raised portions can all have the same depth or have different depths to provide additional zones of differing color shades and textures and to provide additional relief patterns for design purposes. Where the cementitious solids are tiles, the tiles can have thicknesses of, for example, 0.5, 0.625, 0.75, 1, or 2 inches or 1.25, 1.5, 2, 2.5, or 5 cm. Further, the raised portions may have a depth compared to the non-raised portions of, for example, 0.125 or 0.0625 inches or 0.3 or 0.15 cm.

Alternatively, the mold or form liner may not have any raised portions, but the raised portions in the final cementitious solids may be formed by routering depressions or non-raised portions into the major surface of the cementitious solids after they are cured. This adds design flexibility because you can router in custom designs without the added time and cost of creating elaborate molds/form liners. Additionally, it speeds up production of tiles by not being limited by the number of form liners (number of tiles that can be cast daily limited to number of molds), and it allows for an inventory of tiles that can be formed into custom, engraved designs made to order. This alternative results in the continuous, high-concentration of mineral zone being located in the raised portions and the high-concentration of biomass zone being located in the depressions or non-raised portions of the major surface of the cementitious solids. An example of a cementitious solid made by this alternative method is shown in FIG. 1G.

In embodiments, the binder including magnesium is a magnesium oxide, magnesium hydroxide, or magnesium based cement. Magnesium based cement includes magnesium oxychloride cement, which is also known as Sorel cement or magnesite. The magnesium oxychloride cement can be formed by a combination of magnesium oxide and magnesium chloride solution. Another example of magnesium based cement includes magnesium oxysulfate cement, which is the sulfate analogue of magnesium oxychloride and can be formed by a combination of magnesium oxide and magnesium sulfate solution. Yet another example of magnesium based cement is magnesium phosphate cement, which can be formed by a reaction between magnesium oxide and a soluble phosphate. A typical soluble phosphate in the formation of magnesium phosphate cement includes ammonium phosphate monobasic ($NH_4H_2PO_4$). Yet a further example of magnesium based cement is magnesium carbonate cement, which can be formed by a combination of magnesium oxide and magnesium carbonate solution.

In embodiments, the catalyst includes an alkali metal salt, alkaline earth metal salt, or ammonium salt. In particular embodiments, the salts of the catalyst are carbonates, sulfates, phosphates, or borates or combinations thereof. In certain embodiments, the alkali metal carbonates, alkali metal bicarbonates, or alkali metal borates, individually or in combination, are used as the catalyst. For example, in some embodiments, a combination of alkali metal carbonate and alkali metal borate is utilized. In another embodiment, a combination of alkali metal bicarbonate and alkali metal borate is utilized.

In embodiments, the weight percentage of the binder based on the total amount of the cementitious composition is at least 20%, 25%, or 30% and no more than 35%, 40%, or 45%.

In embodiments in which the binder is magnesium oxide, the catalyst may include a carbonate or bicarbonate with or without a borate. In certain embodiments, the binder is magnesium oxide and the catalyst is alkali metal bicarbonate. In other embodiments, the binder is magnesium oxide and the catalyst is alkali metal carbonate. In yet other embodiments, the binder is magnesium oxide and the catalyst is a combination of alkali metal bicarbonate and alkali metal borate.

In embodiments, the weight percentage of the catalyst based on the total amount of the cementitious composition is at least 3%, 4%, or 5% and no more than 6%, 7%, or 8%. In embodiments, the weight ratio of binder to catalyst is 10:1 to 5:1 or 8:1 to 5:1 or 7:1 to 6:1.

To form typical cement, Portland cement clinker is heated in a cement kiln to a calcining temperature of about 600° C. (1,112° F.) and then a fusion temperature of about 1,450° C. (2,640° F.). In contrast, the cement disclosed herein containing a binder containing magnesium and a catalyst containing an alkali metal salt or alkaline earth metal salt require only calcining at temperatures between 700° C. and 1000° C. compared to the two stage process with temperatures of about 1,450° C. for Portland cement. The lower temperature requirements for the cement disclosed herein results in lower energy requirements.

In embodiments, the biomass includes pyrolyzed carbon sources such as biochar or non-pyrolyzed carbon sources such as hemp, wood, bamboo, straw, mulch-type materials, or other cellulosic material or a combination thereof. In certain embodiments, the biomass includes biochar and results in a grayish white coloring. In certain embodiments, the biomass includes walnut husks or shells and results in a white or cream color with higher concentrations of mineral particles and brown coloring where there are higher concentrations of walnut shells or husks.

The disclosed combination of binder and catalyst(s) enables a substantially improved compatibility with carbon compared to traditional cementitious compositions. Specifically, percentage of carbon that can be incorporated into embodiments of the cementitious composition disclosed herein is 30% to 80% carbon. In particular embodiments, the carbon incorporated is 50% to 80% carbon. This binder and bio-aggregate can be pre-mixed and ready for water, thus eliminating complicated manufacturing procedures/equipment to ensure carbonation and acceleration of curing.

In embodiments, the weight percentage of biomass based on the total amount of the cementitious composition is at least 15%, 20%, 25%, or 30% and no more than 40%, 45%, or 50%. In particular embodiments, weight percentage of cellulosic material, such as hemp, based on the total amount of the cementitious composition is at least 5%, 10%, or 15% and no more than 20%, 25%, or 30%. In particular embodiments, weight percentage of biochar used to create dual color shade zones or non-pyrolyzed biomass used to create dual color zones based on the total amount of cementitious composition is 10%, 15%, 20% or 25% and no more than 30%, 35%, 40%, or 45%.

In embodiments, the cementitious composition includes 40 wt % to 75 wt % or 50 wt % to 60 wt % binder, 20 wt % to 57 wt % or 30 wt % to 50 wt % or 30 wt % to 40 wt % biomass, and 3 wt % to 10 wt % or 5 wt % to 8 wt % catalyst based on the total weight percentage of the binder, the catalyst, and the biomass. In other embodiments, the cementitious composition includes 30 wt % to 60 wt % or 40 wt % to 50 wt % binder, 5 wt % to 15 wt % or 7 wt % to 10 wt % hemp, and 3 wt % to 7 wt % or 4 wt % to 6 wt % catalyst, and 30 wt % to 60 wt % or 40 wt % to 50 wt % biochar based on the total weight percentage of the binder, the catalyst, the hemp, and the biochar.

In addition to the binder, catalyst, and biomass discussed above, cementitious compositions may further include activators. In embodiments, activators are metal silicates. In embodiments, the metal in the silicates is selected from alkali metal, alkaline earth metal or aluminum. In particular embodiments, the activator is an aluminum silicate or a calcium silicate. Examples of such silicates include kaolin or wollastonite. In embodiments, combinations of more than one activator are included. For example, different ratios of kaolin and wollastonite can be used.

In embodiments, the weight percentage of the optional activator based on the total amount of the cementitious composition is at least 20%, 25%, or 30% and no more than 35%, 40%, or 45%.

In embodiments, the cementitious compositions may include other optional additives. The additives could include carboxymethylcellulose, calcium bentonite, or reinforcement fibers. Such optional reinforcement fibers could be steel or basalt fibers.

The disclosed cementitious compositions and solids made therefrom offer a unique set of advantages combining typical building material properties of wood and stone. For example, the cementitious solids offer the advantages of wood with regard to being lightweight, renewable, biodegradable, carbon sequestering, nailable/cuttable/screwable, and insulative, while simultaneously offer the advantages of stone with regard to dimensional stability, insolubility in water, being bug proof, and being fireproof. In particular embodiments, the cementitious solid is an architectural tile. In more particular embodiments, the cementitious solid is a floor tile, wall tile or a dropped ceiling tile.

With regard to carbon sequestration, embodiments of the cementitious solid can store equivalent carbon to Douglas Fir without any of the inherent flammability. Further, embodiments of the cementitious solid can represent over 100% reduction in embodied carbon compared to traditional ceramic tiles. Further, unlike wood, cross laminated timber, hemp or bamboo, biochar locked in embodiments of cementitious solid does not revert to carbon dioxide emissions at end of product life (decomposition). Thus, embodiments of the cementitious solid offer permanent carbon storage compared to other biogenic carbon sources.

Cementitious solids containing the cementitious compositions disclosed above may be prepared by processes known in the art. The examples below are illustrative of such processes but are not intended to be limiting.

Example 1: Cementitious Solid Including Biochar

The cementitious solid was formed by mixing the dry ingredients and then water was added to create a slurry. The slurry was pressed and air cured (no kilning). The dry ingredients included the following:

0.46 kg cellulosic material
2.95 kg biochar having particle sizes between 26 mesh and 50 mesh
2.49 kg activator
2.37 kg magnesium oxide
0.38 kg catalyst
0.196 additives.

Example 2: Cementitious Solid Without Biochar

The cementitious solid was formed by mixing the dry ingredients and then water was added to create a slurry. The slurry was pressed and air cured (no kilning). The dry ingredients included the following:

1.518 kg cellulosic material
2.49 kg activator
2.705 kg magnesium oxide
0.412 kg catalyst
0.212 additives.

Prophetic Example 3: Cementitious Solid with Walnut Husks

The cementitious solid was formed by mixing the dry ingredients and then water was added to create a slurry. The slurry was pressed and air cured (no kilning). The dry ingredients included the following:

0.46 kg cellulosic material
2.95 kg walnut husks having particle sizes between 26 mesh and 50 mesh
2.49 kg activator
2.37 kg magnesium oxide
0.38 kg catalyst
0.196 additives.

Testing and Results

Examples 1 and 2 were tested with regard to any fire concerns. Specifically, Examples 1 and 2 had flame spread index of 0 and smoke developed index of 0 based on ASTM E84, Standard Test Method for Surface Burning Characteristics of Building Materials.

Examples 1 and 2 were also tested with regard to insulation regarding thermal transfer. Specifically, heat flow meter testing was performed according to ASTM C518. The results are provided in the table below:

| Sample Name | Avg. Heat Flux (W/m$^2$) | Avg. Thermal Conductance (C) (W/m$^2$*K) | Avg. Thermal Resistance (Rsi) (m$^2$*K/W) | Avg. Thermal Resistivity (r) (m*K/W) | Apparent Thermal Conductivity (k) W/m*K) | Specimen Avg. Thickness (mm) | Specimen Avg. Density (kg/m$^2$) |
|---|---|---|---|---|---|---|---|
| Example 1 | 140.43 | 5.062 | 0.20 | 7.70 | 0.130 | 25.60 | 705.98 |
| Example 2 | 143.32 | 5.154 | 0.19 | 7.28 | 0.137 | 26.62 | 625.75 |

Based on the above testing, it was confirmed that embodiments of the cementitious solid maintain fire prevention and thermal transfer similar to that of traditional cementitious tile with the advantage of substantial carbon sequestration resulting in carbon negative building materials.

What is claimed is:

1. A cementitious solid comprising:
   a binder;
   a catalyst; and
   biomass particles,
   wherein the biomass particles are non-uniformly distributed within the cementitious solid in at least two zones,
   wherein a first zone has a higher concentration of biomass particles than a second zone such that the first zone has a darker color shade than the second zone or the first zone has a different color than the second zone.

2. The cementitious solid according to claim 1, wherein color shade difference ($\Delta L^*$) between the first zone and the second zone is at least 10 on $L^*$ axis of CIELAB color space.

3. The cementitious solid according to claim 1, wherein color difference ($\Delta E^*$) between the first zone and the second zone is at least 3 on CIELAB color space.

4. The cementitious solid according to claim 1, wherein a major surface of the cementitious solid includes a raised portion extending away from the major surface, wherein the first zone or the second zone is located in the raised portion.

5. The cementitious solid according to claim 1, wherein the binder comprises magnesium.

6. The cementitious solid according to claim 5, wherein the binder comprises magnesium oxide, magnesium hydroxide, magnesium oxychloride cement, magnesium oxysulfate cement, magnesium carbonate cement, or magnesium phosphate cement.

7. The cementitious solid according to claim 1, wherein the catalyst comprises a metal salt or ammonium salt.

8. The cementitious solid according to claim 7, wherein the catalyst comprises at least one of sodium carbonate, sodium bicarbonate, or sodium tetraborate.

9. The cementitious solid according to claim 1, wherein the biomass comprises biochar, cellulose fibers, straw, hemp, rice hulls, coconut coir, corn cobs, nut husks and shells, wood mulch, and/or bark mulch.

10. The cementitious solid according to claim 1, further comprising aluminum silicate or calcium silicate.

11. A tile comprising the cementitious solid according to claim 1.

12. A cementitious solid comprising:
a binder;
a catalyst; and
biomass particles having a particle size not less than 50 mesh and not greater than 25 mesh.

13. The cementitious solid according to claim 12, wherein the particle size of the biomass particles is not less than 45 mesh and not greater than 30 mesh.

14. The cementitious solid according to claim 12, wherein the binder comprises magnesium.

15. The cementitious solid according to claim 12, wherein the catalyst comprises a metal salt or ammonium salt.

16. The cementitious solid according to claim 12, wherein the biomass comprises biochar, cellulose fibers, straw, hemp, rice hulls, coconut coir, corn cobs, nut husks and shells, wood mulch, and/or bark mulch.

17. The cementitious solid according to claim 12, further comprising aluminum silicate or calcium silicate.

18. A tile comprising the cementitious solid according to claim 12.

* * * * *